United States Patent
Schmidt et al.

(10) Patent No.: US 10,343,545 B2
(45) Date of Patent: Jul. 9, 2019

(54) SYSTEMS AND METHODS FOR SEPARATING BATTERIES

(71) Applicant: Trumpet Holdings, Inc., Milwaukee, WI (US)

(72) Inventors: Stephen M. Schmidt, Menomonee Falls, WI (US); James R. Hannas, Thiensville, WI (US); Dennis A. Maller, Racine, WI (US)

(73) Assignee: Trumpet Holdings, Inc., Milwaukee, WI (US)

( * ) Notice: Subject to any disclaimer, the term of this patent is extended or adjusted under 35 U.S.C. 154(b) by 91 days.

(21) Appl. No.: 14/997,226

(22) Filed: Jan. 15, 2016

(65) Prior Publication Data

US 2017/0207641 A1    Jul. 20, 2017

(51) Int. Cl.
| | |
|---|---|
| *H02J 7/00* | (2006.01) |
| *B60L 11/18* | (2006.01) |
| *H01H 1/00* | (2006.01) |
| *H02J 9/00* | (2006.01) |
| *B60L 3/00* | (2019.01) |
| *B60L 3/12* | (2006.01) |
| *B60L 58/20* | (2019.01) |

(52) U.S. Cl.
CPC ......... *B60L 11/1864* (2013.01); *B60L 3/0046* (2013.01); *B60L 3/0069* (2013.01); *B60L 3/12* (2013.01); *B60L 58/20* (2019.02); *H01H 1/00* (2013.01); *H02J 9/002* (2013.01); *B60L 2240/547* (2013.01); *Y02T 10/7005* (2013.01); *Y02T 10/7066* (2013.01); *Y02T 10/92* (2013.01)

(58) Field of Classification Search
CPC ...... H02J 7/0026; H02J 7/0021; H02J 7/0045; H02J 7/00; B60L 11/18; B60L 11/1864; B60R 25/04; H01H 67/02
USPC .......................... 320/107; 335/126; 307/10.3
See application file for complete search history.

(56) References Cited

U.S. PATENT DOCUMENTS

| | | | | |
|---|---|---|---|---|
| 3,609,604 | A | * 9/1971 | Schleicher | H01H 50/545 335/132 |
| 3,923,116 | A | 12/1975 | Thompson et al. | |
| 4,039,984 | A | * 8/1977 | DeLucia | H01H 1/58 335/151 |
| 4,168,480 | A | * 9/1979 | De Lucia | H01H 33/021 174/17 GF |

(Continued)

FOREIGN PATENT DOCUMENTS

| | | |
|---|---|---|
| DE | 69401875 T2 | 9/1997 |
| WO | WO 2006/024855 A1 | 3/2006 |
| WO | WO 2012/098383 A1 | 7/2012 |

*Primary Examiner* — Richard Isla
*Assistant Examiner* — Dung V Bui
(74) *Attorney, Agent, or Firm* — Ryan Kromholz & Manion, S.C.

(57) ABSTRACT

Systems and methods for a battery separator system integrating a DC contactor (solenoid) plus control electronics and all required interconnects into a single sealed enclosure for the purpose of selectively connecting and disconnecting a main and auxiliary battery under predetermined conditions. Battery monitoring and control includes programmable time delays that immunize the system from reacting to transient conditions as well as monitoring for and correcting unintended states and disabling operation when voltage conditions fall outside of prescribed limits.

17 Claims, 3 Drawing Sheets

(56) References Cited

U.S. PATENT DOCUMENTS

| | | | |
|---|---|---|---|
| 4,585,983 A * | 4/1986 | Cooper | H02P 6/187 |
| | | | 318/722 |
| 4,800,352 A * | 1/1989 | Haury | H01H 50/643 |
| | | | 200/293 |
| 5,264,777 A | 11/1993 | Smead | |
| 5,488,283 A | 1/1996 | Dougherty et al. | |
| 5,548,164 A * | 8/1996 | Hillard | B60R 25/04 |
| | | | 180/287 |
| 5,554,963 A * | 9/1996 | Johler | H01H 51/29 |
| | | | 200/302.1 |
| 5,767,659 A | 6/1998 | Farley | |
| 5,951,616 A * | 9/1999 | Chiba | F16H 61/0251 |
| | | | 361/146 |
| 5,977,744 A * | 11/1999 | Williams | H02J 7/1423 |
| | | | 320/104 |
| 6,049,263 A * | 4/2000 | Vilou | H01H 51/065 |
| | | | 290/38 R |
| 6,052,266 A * | 4/2000 | Aromin | H01H 47/04 |
| | | | 361/42 |
| 6,057,666 A | 5/2000 | Dougherty et al. | |
| 6,064,289 A | 5/2000 | Wieloch et al. | |
| 6,127,727 A * | 10/2000 | Eytcheson | H01L 23/49562 |
| | | | 257/692 |
| 6,222,341 B1 | 4/2001 | Dougherty et al. | |
| 6,265,955 B1 * | 7/2001 | Molyneux | H01H 1/66 |
| | | | 200/304 |
| 6,271,642 B1 | 8/2001 | Dougherty et al. | |
| 6,417,749 B1 | 7/2002 | Kappel et al. | |
| 6,452,361 B2 | 9/2002 | Dougherty et al. | |
| 6,522,960 B2 | 2/2003 | Nada | |
| 6,949,997 B2 | 9/2005 | Bergh et al. | |
| 7,161,104 B2 | 1/2007 | Bergh et al. | |
| 7,253,584 B2 | 8/2007 | Souther et al. | |
| RE40,341 E | 5/2008 | Salcudean et al. | |
| 7,567,057 B2 | 7/2009 | Elder et al. | |
| 7,884,278 B2 | 2/2011 | Powell et al. | |
| 7,944,333 B2 | 5/2011 | Swartzentruber et al. | |
| 7,990,239 B2 | 8/2011 | Brown et al. | |
| 8,279,027 B2 | 10/2012 | Brown et al. | |
| 8,390,145 B2 | 3/2013 | Harding | |
| 8,719,187 B2 | 5/2014 | Garcia-Moreno | |
| 2003/0200017 A1 * | 10/2003 | Capps | H04L 12/12 |
| | | | 701/36 |
| 2005/0151508 A1 | 7/2005 | Cook et al. | |
| 2007/0268640 A1 * | 11/2007 | Brereton | H02H 7/222 |
| | | | 361/62 |
| 2008/0036419 A1 | 2/2008 | Cook et al. | |
| 2008/0084260 A1 * | 4/2008 | Swartzentruber | H01H 50/023 |
| | | | 335/151 |
| 2009/0102583 A1 * | 4/2009 | Nakamura | H01H 50/54 |
| | | | 335/5 |
| 2010/0246086 A1 * | 9/2010 | Ishiguro | F16F 13/26 |
| | | | 361/160 |
| 2010/0314950 A1 * | 12/2010 | Rutkowski | H01M 10/4207 |
| | | | 307/125 |
| 2011/0218698 A1 | 9/2011 | Bissontz | |
| 2011/0267157 A1 | 11/2011 | Kalmbach et al. | |
| 2011/0320056 A1 * | 12/2011 | Brown | B60L 3/0069 |
| | | | 700/295 |
| 2012/0060786 A1 * | 3/2012 | Okada | F02N 11/087 |
| | | | 123/179.5 |
| 2013/0009464 A1 | 1/2013 | Firehammer et al. | |
| 2013/0241498 A1 | 9/2013 | Koebler | |
| 2015/0001857 A1 * | 1/2015 | Sekiguchi | B60L 7/10 |
| | | | 290/38 C |

* cited by examiner

SYSTEMS AND METHODS FOR SEPARATING BATTERIES

BACKGROUND OF THE INVENTION

The present invention relates to a systems and methods for selectively connecting or separating a pair of batteries depending upon the state of the individual batteries and the charging system so as to maintain and preserve best condition of those batteries.

There are many vehicle applications in which there is a battery (primary) used for starting the vehicle and supporting its various electrical systems. There is also a system for charging that battery whenever the vehicle engine is operating. There are furthermore many applications for an additional (auxiliary) battery or bank of batteries to be used to support auxiliary equipment. Such equipment could be living quarters equipment on a recreational vehicle, a CPAP machine in the sleeper cab of an over the road truck or any other variety of apparatus that require electrical power. The electrical loads that draw power from the auxiliary battery may operate without distinction for whether the vehicle engine and charging system are operating or not. It is common to charge the auxiliary batteries from the same charging system that charges the vehicle primary battery. It is important to prevent the electrical loads that draw power from the auxiliary battery from depleting the vehicle's primary battery to the extent that primary vehicle functions cannot be supported, such as starting the vehicle. For this reason it is necessary to have a means to selectively connect and separate the primary and auxiliary batteries depending upon the condition of those batteries and the status of the vehicles charging system.

Additionally, as parts on a truck are subject to all the weather and bad roads that are experienced by the truck, damage and premature wear can be experienced by a contactor in control of joining and separating the batteries. Furthermore, contacting two direct current power sources creates a potential for a large current to spike across the contactor which could lead to premature wear of the internal components of the contactor as well. Therefore, the industry could benefit from a contactor assembly that is better protected from external influences.

SUMMARY OF THE INVENTION

Provided is a system and methods for separating batteries. The invention being directed to providing a contactor that is better protected from outside influences such as weather and road conditions and also from potentially large current spikes.

The present invention provides that the coil of the contactor is controlled by a bi-polar electronic driver with current limiting functionality. The design of the coil provides reliable latch and unlatch at voltages associated with highly discharged or damaged batteries and elevated ambient temperatures (that raise coil resistance) and furthermore with the electronic current limiting set to prevent the coil from generating Amp Turn levels sufficient to demagnetize the permanent magnet under conditions of high battery voltage and low ambient conditions (that lower coil resistance).

DESCRIPTION OF THE PREFERRED EMBODIMENT

Although the disclosure hereof is detailed and exact to enable those skilled in the art to practice the invention, the physical embodiments herein disclosed merely exemplify the invention which may be embodied in other specific structures. While the preferred embodiment has been described, the details may be changed without departing from the invention, which is defined by the claims.

Figure 1:
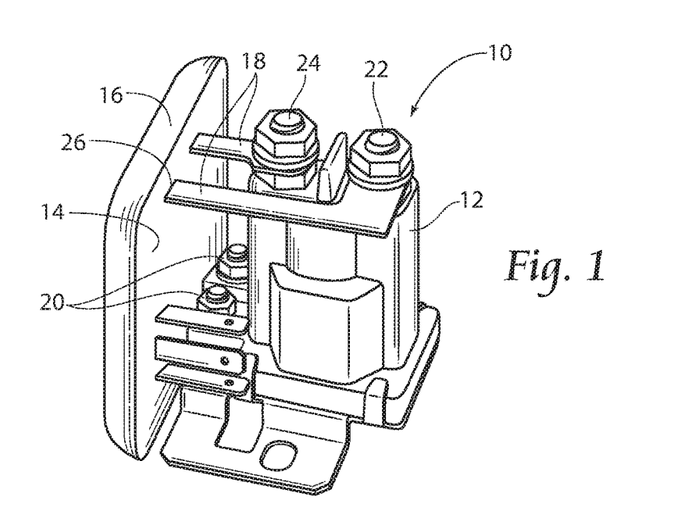
FIG. 1 is a perspective view of a prior art contactor assembly.

FIG. 1 illustrates a prior art contactor assembly 10. The prior art contactor assembly consists of a direct current (DC) contactor 12 electrically connected to a control circuit board (hidden) covered in electrical potting material 14 in an enclosure 16. In other prior art embodiments (not shown) there may be no enclosure, with the control circuit board encapsulated within a block of rigid potting material such as epoxy.

Figure 6:
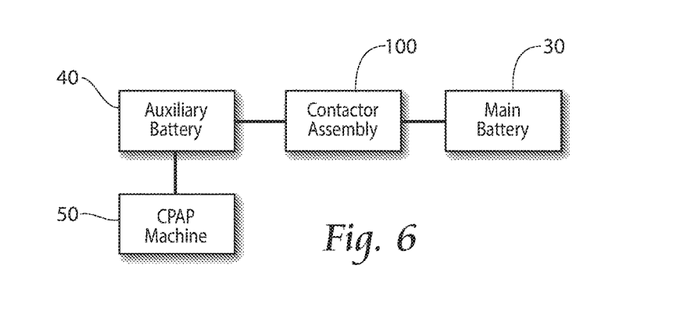
FIG. 6 is a diagram illustrating an intended use of a contactor assembly according to the present invention in a potential system.

The prior art contactor assembly 10 is used primarily for joining and separating a Main battery 30 (see FIG. 6) and an Auxiliary battery 40 (see FIG. 6). The DC contactor 12 has a Main, or first, battery terminal 22 and an Auxiliary, or second, battery terminal 24, each connected to the control circuit board (hidden) via bus bars 18 or wires (not shown). Also exposed are the DC contactor coil connections 20 between the control circuit board (hidden) within the enclosure 16 and the solenoid assembly (hidden) within the contactor 12.

Although, the control circuit board (hidden) is shielded from most environmental events including corrosive elements, moisture, and liquid ingress over the entire life of the product by the electrical potting material 14, the bus bars 18 and the DC contactor coil connections 20 that electrically and mechanically join the control circuit board (hidden) to the DC contactor 12 are exposed to the environment and prone to corrosion or physical damage.

Corrosion of the bus bars 18 creates poor electrical sense interconnects and unpredictable voltage drops that affect the logic and control circuit's ability to accurately measure the voltages of the Main and Auxiliary batteries 30, 40 (see FIG. 6). When the accuracy of the voltage measurements are compromised, the prior art contactor assembly 10 may react to the compromised data and actuate the DC contactor 12 to connect and disconnect the Main and Auxiliary batteries 30, 40 at voltage levels different than the designated voltage values. Depending on the severity of this corrosion and degradation of the electrical connection the prior art contactor assembly 10 may completely fail to open the circuit between the Main and Auxiliary batteries 30, 40 rendering the prior art contactor assembly 10 absolutely unable to protect the Main battery 30 from becoming discharged below a preset voltage value. Alternatively, it might fail to charge the auxiliary battery.

Additionally, over the life of the product, corrosion of the bus bars 18 along with thermal aging and potting material fatigue creates voids (not shown) in the potting material 14 around the junctions 26 of the potting material 14 and the bus bars 18. The voids (not shown) become the primary path for environmental ingress to the control circuit board (hidden) which creates unpredictable device operation, complete device failure, or even provide low voltage ignition sources from unintended ground paths.

In addition to corrosion, the bus bars 18 are continuously exposed at battery potential and present a constant threat of being bridged by a conductive object to each other or chassis ground. Further, the exposed DC contactor coil connections 20 present a constant threat of being shorted to ground or disconnected.

Figure 2:
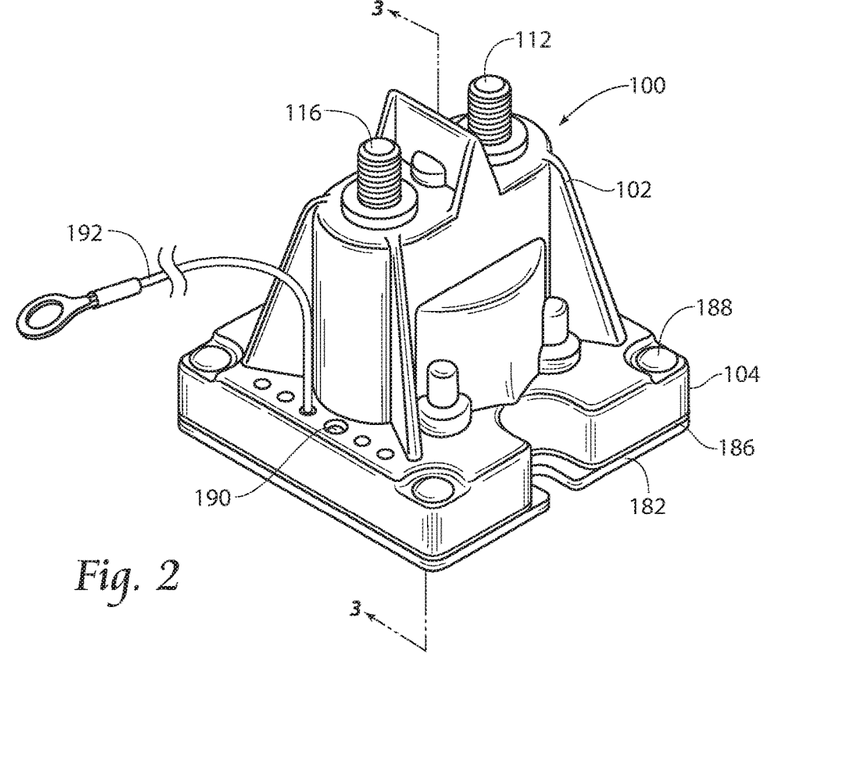
FIG. 2 is a perspective view of a contactor assembly according to the present invention.
Figure 3:
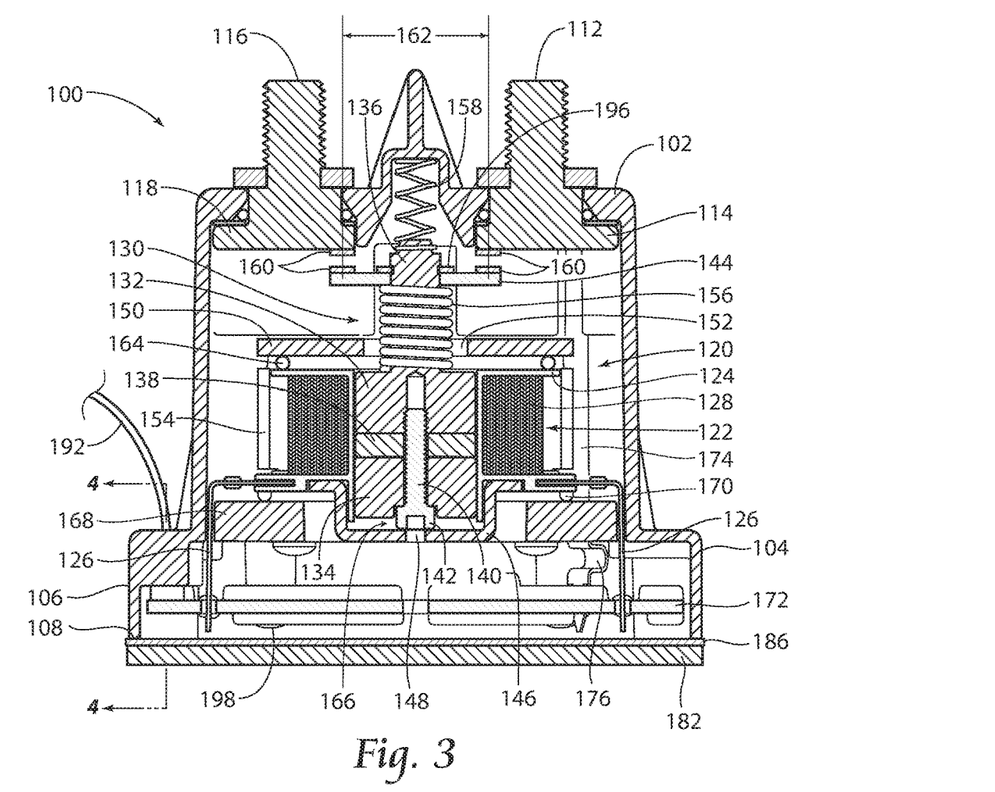
FIG. 3 is a cross-section view of the contactor assembly in FIG. 1 along line 3-3.

FIGS. 2 and 3 illustrate a contactor assembly 100 according to the present invention. The contactor assembly 100 preferably comprises a housing 102, a first stud 112, a second stud 116, a solenoid assembly 120 (referred to occasionally as "contactor"), and a printed circuit board (PCB) 172.

The solenoid assembly 120 is preferably a bi-stable magnetic latching solenoid. The solenoid assembly 120 preferably comprises a coil assembly 122, a plunger assembly 130, a crossbar 144, an end cap 146, a pole washer 150, and a pair of half shells 154. The coil assembly 122 comprises a bobbin 124, a pair of coil terminals 126 electrically connected to the bobbin 124, and magnet wire 128 wrapped around the bobbin 124. The bobbin 124 is at least partially positioned within the end cap 146. The pair of half shells 154 are preferably positioned around the outside of the coil assembly 122 and in direct contact with the pole washer 150 and the end cap 146 to complete the magnetic circuit; however, this relationship is not visible in the cross-sectional view of FIG. 3.

The plunger assembly 130 preferably comprises a first plunger part 132, a second plunger part 134, a magnet 138, and a cap screw 140. The magnet 138 is preferably a rare earth permanent ring magnet (NdFeB, Grade N42M) and is sandwiched between the first plunger part 132 and the second plunger part 134. The first and second plunger parts 132, 134 preferably comprise low carbon steel and are physically joined by the cap screw 140, which is preferably made from non-magnetic stainless steel. The plunger assembly 130 is located mostly within the bobbin 124 with the second plunger part 134 closest to the end cap 146.

A plunger shaft 136 preferably extends outward from the first plunger part 132 and through the pole washer 150 and a seal spring 156 and terminates with attachment to a head spring 158. The crossbar 144 is mounted to the plunger shaft 136 between a retaining clip 196 and seal spring 156

Contacts 160 are placed on the crossbar 144 and the triangular heads 114, 118 of the first and second studs 112, 116, respectively. The contacts 160 preferably comprise silver cad oxide chips and are silver-brazed onto the stud heads 114, 118 and the crossbar 144. The studs 112, 116 are rotated such that the center to center distance 162 between contacts 160 is minimized. This in turn lowers the material usage in the crossbar 144 and thereby reduces the crossbar's 144 total mass. The silver cad oxide material is able to handle high closing currents, which are expected in an application of connecting two batteries charged to different levels. However, other materials exhibiting the same characteristics are also contemplated.

It should be noted that a through-hole 152 in the pole washer 150 is preferably sized large enough for the plunger shaft 136 to pass through without excessive loss of force due to non-force producing flux leakage.

A coil o-ring 164 is positioned between the bobbin 124 and the pole washer 150 and is compressed as needed to take up any dimensional tolerance stack ups and also to minimize movement from vibration. The o-ring 164 also biases and maintains the bobbin 124 to its proper position in the solenoid assembly 120.

The cap screw 140 has a cap screw head 142 which extends outward from the first plunger part 132. When a positive coil pulse is applied, the plunger assembly 130 will move towards the pole washer 150 (contacts closed). When a negative coil pulse is applied, the plunger assembly 130 will move towards the end cap 146 (contacts open) until the cap screw head 142 makes contact with the end cap 146 and defines a gap 166 between the second plunger part 134 and the end cap 146. The size of the gap 166 between the cap screw head 142 and the end cap 146 determines the force required to open the solenoid assembly 120 and also affects the coil current required to close the solenoid assembly 120.

During the closing operation, the coil assembly 122 and the magnet 138 work together to overcome the head spring 158 and the seal spring 156. Inversely, during the opening operation, the coil assembly 122 must cancel out the magnet 138 enough for the head spring 158 and the seal spring 156 to overcome the magnet 138.

The solenoid assembly 120 is secured inside the housing 102 with a solenoid retainer 168. An o-ring 170 is positioned between the end cap 146 and the solenoid retainer 168; however, this relationship is not visible in the cross-sectional view provided in FIG. 3. The o-ring 170 takes up any dimensional tolerance stack ups and may also act as a shock absorber when the end cap 146 is impacted by the plunger assembly 130 at each opening of the solenoid assembly 120. The o-ring 170 also encourages an intimate contact between the end cap 146 and the edges of the half shells 154 so as to minimize the magnetic reluctance at those interfaces. The solenoid retainer 168 may also assist in providing proper alignment of the electrical connections of a first stud-to-PCB terminal 174 and a second stud-to-PCB terminal (hidden) between the first and second studs 112, 116 and the printed circuit board 172 as well as the coil terminals 126 to the PCB 172 (discussed below).

The PCB 172 is preferably located inside the housing 102 and below the solenoid assembly 120 as oriented in FIG. 3. The PCB 172 is preferably conformal coated or over-molded and secured by a plurality of screws 198, preferably PLASTITE® screws.

The first stud-to-PCB terminal 174 and the second stud-to-PCB terminal (hidden) electrically connect the first stud 112 and the second stud 116 to the PCB 172, respectively. The first stud-to-PCB terminal 174 and the second stud-to-PCB terminal (hidden) are voltage sense lines linking the high current first and second studs 112, 116 to the PCB 172. Both the first stud-to-PCB terminal 174 and the second stud-to-PCB terminal (hidden) may comprise a bend 176 therein. The bend 176 allows for thermal expansion and contraction, without stressing the solder joint connecting the first stud-to-PCB terminal 174 and the second stud-To-PCB terminal (hidden) to the PCB 172.

The PCB 172 is also preferably electrically connected to the solenoid assembly 120 through the pair of coil terminals 126.

The location of the PCB 172 inside the housing 102 allows the PCB 172 to monitor battery voltage (batteries are connected to the high current studs 112, 116) without requiring any additional connections. Limiting the number of connections to the batteries 30, 40 also limits the opportunities for failure, short circuits, etc.

Figure 4:
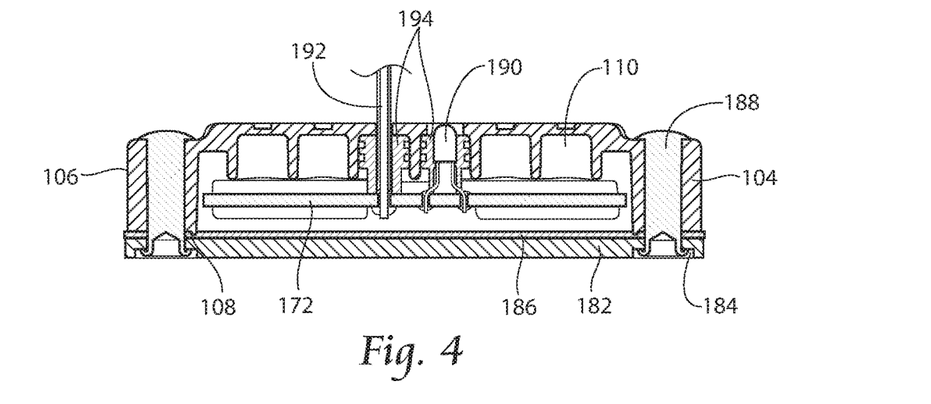
FIG. 4 is a cross-section view of the contactor assembly in FIG. 3 along line 4-4.

The housing 102 comprises a base 104 with a sealing lip 108 around a perimeter 106. A mounting plate gasket 186 is compressed between the sealing lip 108 and a mounting plate 182. The mounting plate 182 is preferably affixed to the housing 102 by rivets 188 and is of a thickness to provide adequate stiffness between the rivets 188. The mounting plate 182 may include machined counter bored recesses 184 for the rivets 188 to be recessed within.

Additionally or alternatively, any number of LED indicators 190 and lead wires for I/O ports (not shown) and the ground 192 may be connected to the PCB 172 inside the housing 102 but visible or accessible outside the housing 102, shown here in the base 104. For example, an LED 190 may signal whether the solenoid assembly 120 is closed by remaining "on-solid" and the LED 190 may be "on-blinking" when the solenoid assembly 120 is open. Additionally or alternatively, LEDs 190 may be used to signal other operational conditions and/or error message. Furthermore, additional leads (not shown) may be used for data transfer (e.g., updates or uploading operational data) or real-time system health monitoring. Multiple configurations of the contactor assembly 100 are possible. The prescribed number of lead wires (not shown) and/or LEDs 190 can be determined at the time of order and may be punched or drilled into the base 104 of the housing 102 at that time. Molded pockets 110 in the base 104 are preferably sized to accept standard cable seals 194 (see FIG. 4).

In operation a microprocessor (not shown) on the PCB 172 will preferably be continuously monitoring voltage values of the main and auxiliary batteries 30, 40 and the current state of the solenoid assembly 120 (i.e., open or closed). The voltage values are preferably taken at the studs 112, 116. The voltage at the studs 112, 116 will differ from the voltage at each battery 30, 40 by a factor that is the product of current flow between batteries 30, 40 in amps multiplied by the resistance of the respective cable (not shown) connecting the batteries 30, 40 to their respective stud 112, 116. In all but the first minute or two after the contactor closes, the inter-battery current is normally of a magnitude such that the voltage drop across the cables connecting the batteries 30, 40 to the studs 112, 116 is not of great significance in determining the correct state for the solenoid assembly 120. To limit the need for a second "Vsense" connection at each battery 30, 40 and to avoid reacting to high cable voltage drop during the first seconds to minute or so after contactor operation, time delays are preferably introduced in the cycle of operation.

The ability to sense the independent voltages of the Main and Auxiliary batteries 30, 40 at the studs 112, 116 when the solenoid assembly 120 is open and millivolt difference between the Main and Auxiliary batteries 30, 40 at the studs 112, 116 when the solenoid assembly 120 is closed allows the microprocessor to use logic to verify if the solenoid assembly 120 is in the correct open or closed state. By nature, a bi-stable magnetic contactor does not require any power to stay in the contacts open or contacts closed state; the microprocessor provides a pulse of energy to actuate the solenoid assembly 10 and toggles the solenoid assembly 120 open or closed depending on voltage inputs measured at the studs 112, 116. The contactor assembly 100 is preferably designed to open and close the solenoid assembly 120 under specified maximum ambient and minimum voltage conditions. Without further intervention, permanent degradation of the magnet 138 could occur under certain anticipated combinations of voltage and temperature. To protect against this, the microprocessor (not shown) incorporates current limiting procedures.

It is possible that external influence such as shock or internal solenoid malfunction could create a situation in which the voltage values indicate to the microprocessor that the solenoid assembly 120 should be in one of an open or a closed state when in actuality the solenoid assembly 120 is in the opposite state. This failure will continue to cause unintended operation until corrected.

If the microprocessor determines the solenoid assembly 120 is in the incorrect state, the solenoid assembly 120 will be pulsed a predetermined number of times, preferably up to three times, in an attempt to restore the proper state. If the pulsing does not restore the solenoid assembly 120 to the proper state, the microprocessor will set an error condition. Once in the error condition the microprocessor will recheck the state of the solenoid assembly 120 at predetermined intervals, preferably about every two minutes.

It is preferable that the solenoid assembly 120 be open and remains open if the Main battery 30 is below a first voltage limit. If the solenoid assembly 120 is closed and voltage of the Main battery 30 falls below the first voltage limit, the solenoid assembly 120 is opened, given that other requirements are met, so that the loads on the auxiliary side of the system cannot draw down the Main battery 30.

The solenoid assembly 120 will be closed and remain closed if the voltage of the Main battery 30 is at or above a predetermined voltage limit sufficient to charge both batteries, barring the contactor assembly 100 experiencing any of the limitations set forth herein which would prevent the changing of state from open to closed.

Additionally or alternatively, instead of immediately toggling the solenoid assembly 120 "on" (contacts closed) and "off" (contacts open) upon reaching the contacts close voltage "$V_{CON}$" and the contacts open voltage "$V_{DCON}$" thresholds, the microprocessor will wait a predetermined duration of time (the duration of time could be set or changed according to operational demands and requirements.

If the measured Main battery voltage does not satisfy the requirements at any time during the "ON Delay/OFF Delay," the time delay will restart. This ensures that the solenoid assembly 120 will not respond to transient conditions. For field diagnosis this means the appropriate $V_{CON}$ and $V_{DCON}$ voltage levels must be maintained constantly for a minimum of the predetermined "On Delay/OFF Delay" duration to induce a change of state.

High Voltage Lockout:

There is a considerable lack of general understanding across the overall battery separator market as to what actually happens with respect to inrush current when two batteries at different potential are connected suddenly by an electromechanical device. The contacts 160 of the contactor assembly 100 are subject to a short duration but extremely high magnitude current spike that is only limited by the inherent impedance produced by the cable and other components in the circuit. Typical battery separators provide warnings that the device may be damaged at higher than rated operational voltages but do not provide safeguards to prevent this from happening. Higher than rated system voltage does not only risk damaging electronic components; these high voltage conditions may be passed through the logic and control circuit to the coil of the DC contactor where the coil windings and solenoid rare earth permanent magnet may be damaged. Higher than rated system voltages on only the Main battery stud 112 creates a greater potential differential between the Main and Auxiliary batteries studs 112, 116 that directly creates higher magnitude inrush currents that are likely to damage, weld, or prematurely age the contacts 160.

According to the present invention, the potential for damage from higher than rated system voltages may be reduced by continuously monitoring the voltage values at the studs 112, 116 and applying logic to determine if the system voltage has exceeded a predetermined upper limit programmed in the microprocessor (for example, 17 VDC). If voltage exceeds the predetermined limit on the Main battery stud 112 the contactor assembly 100 will remain in its current contacts open or contacts closed state and continue to monitor conditions until measurements indicate the voltage is within the predetermined limits. This circumstance will also set an error condition (for example, turning the LED 190 to "off-solid") to notify the operator that there is a potentially hazardous system fault.

Low Voltage Lockout:

Similar to the High voltage lockout discussed above; low voltage measured at the Main battery stud 112 will create conditions that endanger proper operation of the contactor assembly 100 as well. Lower than rated system voltage may be passed through the logic and control circuit to the coil assembly 122 and the coil assembly 122 will not be given enough power to properly change the state of the solenoid assembly 122.

Lower than rated system voltage on only the Main battery stud 112 also likely indicates a damaged Main battery 30 and creates a greater potential differential between the Main and Auxiliary batteries 30, 40. The greater potential between batteries 30, 40 directly creates higher magnitude inrush currents that are likely to damage, weld, or prematurely age the contacts 160.

According to the present invention, the potential for damage from lower than rated system voltages may be reduced by continuously monitoring the Main and Auxiliary battery studs 112, 116 and applying logic to determine if the system voltage has dropped below a predetermined lower limit programmed in the microprocessor (for example, 9.8 VDC). If voltage is at or below the predetermined limit on the Main battery stud 112, the contactor assembly 100 will remain in its current contacts open or contacts closed state and continue to monitor conditions until measurements indicate the voltage is within the predetermined limits. This circumstance will set an error condition (for example, turning the LED 190 to "off-solid") to notify the operator that there is a potentially hazardous system fault.

Figure 5:
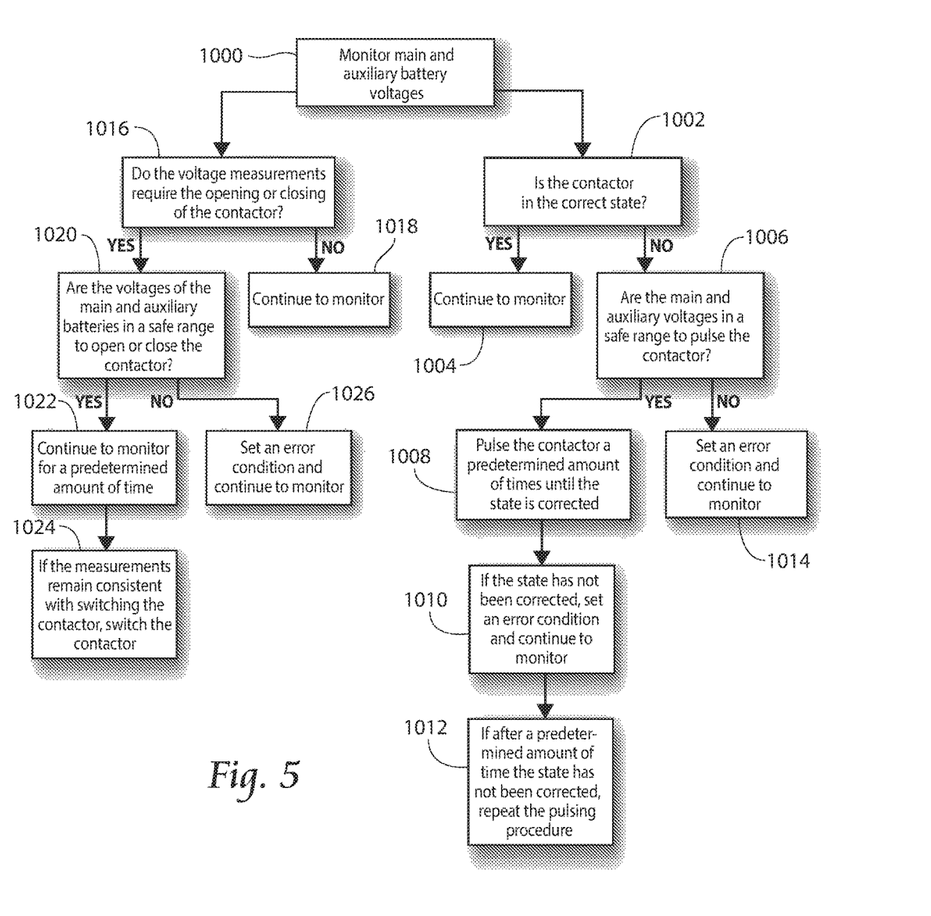
FIG. 5 is an operational flow diagram of a monitoring method according to the present invention.

FIG. 5 illustrates an example of the monitoring process and situationally switching the contactor 120 under certain conditions. As shown, the Main and Auxiliary batteries are continually monitored 1000. The state of the contactor is determined 1002. If the contractor is in the correct state, continue to monitor 1004. If the contractor is in the incorrect state, it is determined whether the voltages of the Main and Auxiliary batteries are in a safe range to pulse the contactor 1006. If so, the contactor is pulsed up to a predetermined amount of times until the state is corrected 1008. If after pulsing the contactor is still in the incorrect state an error condition is set and the contactor continues to be monitored 1010. If, after a predetermined amount of time has passed, the state is still incorrect, the pulsing procedure may be repeated 1012. If initially the Main and Auxiliary batteries are not in a safe range for pulsing the contactor, an error condition is set and monitoring of the state condition and the voltages of the Main and Auxiliary batteries is continued 1014.

Additionally or alternatively, it is determined whether the voltage measurements require the opening or closing of the contactor 1016. If not, continue to monitor the voltage values 1018. If so, it is determined whether the voltages of the main and auxiliary battery are in a safe voltage range to open or close the contactor 1020. If the voltages are in the safe range, continue to monitor for a predetermined amount of time 1022. If the measurements remain consistent with switching the contactor, switch the state of the contactor 1024. If the voltages are not within the safe range, an error condition is set and monitoring continues 1026.

FIG. 6 illustrates a potential intended use of the contactor assembly 100 according to the present invention. As shown here, the contactor assembly 100 is placed between the Main battery 30 and the Auxiliary battery 40, whereby the Auxiliary battery 40 is also directly electrically connected to a Continuous Positive Airway Pressure (CPAP) machine 50.

The foregoing is considered as illustrative only of the principles of the invention. Furthermore, since numerous modifications and changes will readily occur to those skilled in the art, it is not desired to limit the invention to the exact construction and operation shown and described. While the preferred embodiment has been described, the details may be changed without departing from the invention, which is defined by the claims.

The invention claimed is:

1. A system for separating a main battery and an auxiliary battery of a vehicle electrical system, comprising:
   a housing;
   a first stud for connecting one of the main battery and the auxiliary battery to a contactor and a second stud for connecting one of the main battery and the auxiliary battery to the contactor;
   the contactor retained within the housing switchably contactable with the first stud and the second stud, wherein the contactor may hold a position in at least one of an open-contactor state and a closed-contactor state;
   a first stud-to-printed circuit board terminal located within the housing electrically connecting the first stud to the printed circuit board and a second stud-to-printed circuit board terminal located within the housing electrically connecting the second stud to the printed circuit board;
   at least one of said first stud-to-printed circuit board terminal and said second stud-to-printed circuit board terminal having a bend, wherein said bend allows for thermal expansion without stress to a solder joint connecting at least one of said first stud-to-printed circuit board terminal and said second stud-to-printed circuit board terminal to said printed circuit board;
   a pair of coil terminals located within the housing electrically connecting the contactor to the printed circuit board;
   the printed circuit board providing for a microprocessor retained within the housing;
   the microprocessor monitoring independent voltages of the main battery and the auxiliary battery and opening the contactor where the main battery voltage is below a first voltage limit;
   the microprocessor monitoring independent voltages of the main battery and the auxiliary battery and closing the contactor where the main battery voltage is above a second voltage limit; and
   the contactor, the printed circuit board, the microprocessor, a portion of the first stud, and a portion of the second stud sealed inside the housing.

2. The system of claim 1, wherein the contactor is a bi-stable contactor.

3. The system of claim 1 wherein the printed circuit board, the microprocessor and the contactor are communicatively coupled to determine whether the contactor is in a correct state; and
for pulsing the contactor when the contactor is in an incorrect state.

4. The system of claim 1 wherein the printed circuit board, the microprocessor and the contactor are communicatively coupled to provide for pulsing the contactor until at least one of an actual state is equivalent to a calculated state.

5. The system of claim 1 wherein the printed circuit board, the microprocessor, the first stud and the second stud are communicatively coupled to provide for continuous monitoring of independent voltages of at least one of the main battery and the auxiliary battery.

6. The system of claim 5 wherein at least one of the first stud and the second stud provide for a location for monitoring of the independent voltages of at least one of the main battery and the auxiliary battery.

7. The system of claim 1 wherein the printed circuit board, the microprocessor, first stud and second stud are communicatively coupled to provide continued monitoring of the independent voltage of the main battery for a predetermined duration of time prior to changing a state of the contactor.

8. The system of claim 1 wherein the printed circuit board, the microprocessor, the first stud, the second stud and the contactor are communicatively coupled to provide for changing the state of the contactor where the independent voltage of the main battery satisfies at least one of the first voltage limit and the second voltage limit for which the state of the contactor is to be changed.

9. The system of claim 1 wherein the printed circuit board, the microprocessor, the first stud, the second stud and the contactor are communicatively coupled to provide for the contactor remaining at the state until the main battery voltage declines below a predetermined upper limit; and
the contactor remaining at the state until the main battery voltage raises above a predetermined lower limit.

10. The system of claim 1 further comprising at least one lead wire in electrical communication with the printed circuit board wherein the at least one lead wire is configured to relay at least one of input data and output data to and from the printed circuit board.

11. The system of claim 1 further comprising an LED providing for an error condition.

12. A method for separating a main battery and an auxiliary battery of a vehicle electrical system having,
a housing;
a first stud for connecting one of a main battery and an auxiliary battery to a contactor and a second stud for connecting one of the main battery and the auxiliary battery to the contactor;
the contactor retained within the housing switchably contactable with the first stud and the second stud in a bi-stable connection, wherein the contactor may hold a position in at least one of an open-contactor state and a closed-contactor state;
a first stud-to-printed circuit board terminal located within the housing electrically connecting the first stud to the printed circuit board and a second stud-to-printed circuit board terminal located within the housing electrically connecting the second stud to the printed circuit board;
at least one of said first stud-to-printed circuit board terminal and said second stud-to-printed circuit board terminal having a bend, wherein said bend allows for thermal expansion without stress to a solder joint connecting at least one of said first stud-to-printed circuit board terminal and said second stud-to-printed circuit board terminal to said printed circuit board; and
a pair of coil terminals located within the housing electrically connecting the contactor to the printed circuit board,
the method comprising the steps of:
measuring at least one of a main battery voltage and an auxiliary battery voltage;
determining a state of a contactor;
opening the contactor where the main battery voltage is below a first voltage limit;
closing the contactor where the main battery voltage is above a second voltage limit; and
mechanically pulsing the contactor to a correct state where the contactor is in an incorrect state.

13. The method of claim 12 further comprising the steps of:
determining whether the main battery voltage and the auxiliary battery voltage are below a predetermined upper limit and above a predetermined lower limit where the contactor is in the incorrect state;
continuing to measure the voltage value of the at least one of the main battery and the auxiliary battery for a predetermined duration of time prior to pulsing the contactor; and
changing the state of the contactor if the voltage value of the at least one of the main battery and the auxiliary battery continually stays the same as or exceeds at least one of the first voltage limit and the second voltage limit throughout the predetermined duration of time.

14. The method of claim 12 further comprising the steps of:
determining whether the contactor is in an open-contactor state or a closed-contactor state (an actual state);
determining whether the contactor should be in the open-contactor state or the closed-contactor state (a calculated state);
comparing the actual state with the calculated state;
determining whether the main battery voltage and the auxiliary battery voltage are below the predetermined upper limit and above the predetermined lower limit;
pulsing the contactor until at least one of the actual state is equivalent to the calculated state;
setting an error signal where the contactor remains in the incorrect state; and
repeating pulsing where the contactor remains in the incorrect state after a predetermined time.

15. The method of claim 12 wherein the state continues where at least one of the state is the correct state, and the main battery voltage and the auxiliary battery voltage require maintaining the state; and
continuing to monitor the at least one of the state, and the main battery voltage and auxiliary battery voltage.

16. The method of claim 12 wherein determining whether at least one of the main battery voltage and the auxiliary battery voltage are at least one of above a predetermined upper limit and below a predetermined lower limit; and
transmitting an error condition where the at least one of main battery voltage and the auxiliary battery voltage exceeds at least one of the predetermined upper limit and the predetermined lower limit.

17. A system for separating a main battery and an auxiliary battery of a vehicle electrical system, comprising:
a housing, a first stud for connecting one of the main battery and the auxiliary battery to a contactor and a second stud for connecting one of the main battery and the auxiliary battery to the contactor;

the contactor retained within the housing switchably contactable with the first stud and the second stud in a bi-stable connection, wherein the contactor may hold a position in at least one of an open-contactor state and a closed-contactor state;

a first stud-to-printed circuit board terminal located within the housing electrically connecting the first stud to the printed circuit board and a second stud-to-printed circuit board terminal located within the housing electrically connecting the second stud to the printed circuit board;

at least one of said first stud-to-printed circuit board terminal and said second stud-to-printed circuit board terminal having a bend, wherein said bend allows for thermal expansion without stress to a solder joint connecting at least one of said first stud-to-printed circuit board terminal and said second stud-to-printed circuit board terminal to said printed circuit board;

a pair of coil terminals located within the housing electrically connecting the contactor to the printed circuit board;

the printed circuit board providing for a microprocessor retained within the housing;

the microprocessor monitoring independent voltages of the main battery and the auxiliary battery and opening the contactor where the main battery voltage is below a first voltage limit;

the microprocessor monitoring independent voltages of the main battery and the auxiliary battery and closing the contactor where the main battery voltage is above a second voltage limit; and the contactor, the printed circuit board, the microprocessor, a portion of the first stud, and a portion of the second stud sealed inside the housing.

\* \* \* \* \*